(12) United States Patent
Elyasi

(10) Patent No.: US 8,721,947 B2
(45) Date of Patent: May 13, 2014

(54) SYSTEM AND METHOD FOR PRODUCING CUSTOMIZED ITEMS

(76) Inventor: Yaron Elyasi, Hod Hasharon (IL)

(*) Notice: Subject to any disclaimer, the term of this patent is extended or adjusted under 35 U.S.C. 154(b) by 341 days.

(21) Appl. No.: 12/739,147

(22) PCT Filed: Oct. 29, 2008

(86) PCT No.: PCT/IL2008/001420
§ 371 (c)(1),
(2), (4) Date: Apr. 22, 2010

(87) PCT Pub. No.: WO2009/057107
PCT Pub. Date: May 7, 2009

(65) Prior Publication Data
US 2011/0215501 A1    Sep. 8, 2011

Related U.S. Application Data

(60) Provisional application No. 61/000,730, filed on Oct. 29, 2007.

(51) Int. Cl.
*B29C 47/92* (2006.01)
(52) U.S. Cl.
USPC .......................... 264/219; 264/280; 264/299
(58) Field of Classification Search
CPC ............ B29C 47/0059; B29C 47/0866; B29C 2947/92571

USPC .......................................... 264/219, 280, 299
See application file for complete search history.

(56) References Cited

U.S. PATENT DOCUMENTS

| | | | |
|---|---|---|---|
| 3,046,178 A * | 7/1962 | Tupper ......................... | 156/167 |
| 3,097,398 A | 7/1963 | Inglesby | |
| 3,412,431 A * | 11/1968 | Lemelson ........................ | 425/1 |
| 3,836,416 A | 9/1974 | Ropiequet | |
| 4,131,667 A | 12/1978 | Lovell et al. | |
| 4,942,910 A | 7/1990 | Hamamura | |
| 5,435,518 A * | 7/1995 | Iguchi ............................ | 249/55 |
| 5,435,959 A | 7/1995 | Williamsom et al. | |
| 6,280,784 B1 | 8/2001 | Yang et al. | |
| 2005/0125924 A1 | 6/2005 | Benjamin et al. | |
| 2005/0196482 A1 | 9/2005 | Khoshnevis | |
| 2006/0008967 A1 | 1/2006 | Polk et al. | |
| 2006/0177540 A1 | 8/2006 | Lichtinger | |

* cited by examiner

*Primary Examiner* — James Sanders
(74) *Attorney, Agent, or Firm* — Henry M. Sinai; IP-Partnership

(57) ABSTRACT

A system and method for producing customized items is provided. The system includes a computer interface, an extruder and a mold supported by a movable support unit, all in communication with a control unit. The extruder and support unit are activatable by the control unit to produce a customized item in accordance with the shape of the mold and design parameters associated with the customized item onto the mold. The extruder may be configured to be movable and to extrude material having elastic properties onto the mold in a single continuous extrusion.

9 Claims, 9 Drawing Sheets

SYSTEM AND METHOD FOR PRODUCING CUSTOMIZED ITEMS

CROSS-REFERENCE TO RELATED APPLICATIONS

This application is a U.S. National Phase Application under 35 U.S.C. 371 of PCT International Application No. PCT/IL2008/001420, which has an international filing date of Oct. 29, 2008, and which claims priority from U.S. Provisional Patent Application No. 61/000,730, filed Oct. 29, 2007, all of which are incorporated herein by reference in their entirety.

FIELD OF THE INVENTION

The present invention relates to a system and method for customizing and production of individually designed items.

BACKGROUND OF THE INVENTION

Generally, the consumer market is divided into three sectors, the mass-produced, individual one-off and limited editions.

The majority of products purchased by consumers are identical or semi-identical copies which are manufactured in large quantities for efficiency and in order to reduce the price. Most chairs, tables, fruit bowls, chandeliers, lamps and the like that are found in the average home are identical to products found elsewhere.

At the other end of the scale, individually designed one-off or unique 'luxury' items are designed and manufactured for a very small segment who are able to afford the commensurate high prices which such one-off items are able to command.

In between, is found the limited editions, designer items which are generally expensive and thus restricted to a relatively small segment of consumers.

Most people would like to express their individuality in the design of their home and thus there is a need to provide a system and method for producing customized items and articles, which overcome the disadvantages of present systems.

SUMMARY OF THE PRESENT INVENTION

The present invention presents a system and method for producing individually designed items at low cost.

The system includes a computer interface, an extruder and a mold supported by a movable support unit, all in communication with a control unit. The extruder and support unit are activatable by the control unit to produce a customized item in accordance with the shape of the mold and design parameters associated with the customized item. The extruder is configured to be movable and to extrude material having elastic properties onto the mold in a single continuous extrusion.

In an embodiment of the present invention, there is provided a system for producing customized products. The system includes a control unit; a computer interface, an extruder and a mold supported by a movable support unit, all in communication with a control unit. The extruder and support unit are activatable by the control unit to produce a customized item in accordance with the shape of the mold and design parameters associated with the customized item.

Furthermore, in accordance with an embodiment of the invention, the system may further include an adapter configured to connect the support unit to the mold.

Furthermore, in accordance with an embodiment of the invention, the extruder may include at least one nozzle for extruding material, a container for receiving material and a heater to heat the material to an elastic state for extrusion. The extruder may be configured to extrude in a horizontal mode, a vertical mode or be attachable to a movable robotic-type arm.

Furthermore, in accordance with an embodiment of the invention, the material may be a thermoplastic material which includes any of a group of materials including Polystyrene (PS) Plastic Resin and Styrene Acrylonitrile (SAN) Plastic Resin Acrylonitrile Butadiene Styrene (ABS) Plastic Resin, Polypropylene, Acrylic, Thermoplastic rubber (TPR), glass, wax and recycled plastic.

Furthermore, in accordance with an embodiment of the invention, the support unit may include a movable robotic-type arm, the robotic-type arm being configured to be mounted on to any of a group of surfaces including a wall, ceiling, floor table and flat surface.

Furthermore, in accordance with an embodiment of the invention, the mold may be constructed from any of a group of materials including segments of polyurethane foam, a unitary piece of polyurethane foam, aluminum, cardboard and silicone coating on a heat resistant fabric. The mold may be constructed from a material which may be expanded to a pre-determined shape.

Furthermore, in accordance with an embodiment of the invention, the mold may include a rod having a generally rectangular component attached at one end and an adapter attached at its other end, distal from the rectangular component. The shape of the mold may be formed around the rod. The rod and the material formed around the rod may have at least the property of preventing the material from adhering to the rod.

Furthermore, in accordance with an embodiment of the invention, the rod may be formed from any of a group including aluminum and PVC and the material may be any of a group of materials including polyurethane foam, cardboard and silicone coating on a heat resistant fabric.

Furthermore, in accordance with an embodiment of the invention, the mold may include an aperture formed in the outer surface of the mold; the aperture may be configured to allow the material to be extracted.

Additionally, there may be also provided a method for producing customized products. The method may include the steps of:

creating at least one mold;
creating a customized design pattern;
fitting the mold onto a support unit;
activating an extruder to extrude material onto the at least one mold;
activating a support unit to move the at least one mold; and
separating the mold from the finished product.

The combination of activating the extruder and activating the support unit in accordance with the shape of the mold and in accordance with the design parameters associated with the design pattern produces the customized product.

Furthermore, in accordance with an embodiment of the invention, the step of activating an extruder may include the steps of:

heating the material to an elastic state for extrusion; and
extruding the heated material through the at least one nozzle.

Furthermore, in accordance with an embodiment of the invention, the step of activating an extruder further may include the step of moving the extruder into one of a group of modes including a horizontal mode and a vertical mode.

Furthermore, in accordance with an embodiment of the invention, the step of activating the extruder may include the step of attaching the extruder to a movable robotic-type arm. The step of activating a support unit may include the step of mounting the robotic-type arm onto any of a group of surfaces including a wall, ceiling, floor table and flat surface.

Furthermore, in accordance with an embodiment of the invention, the step of creating a customized design pattern may include the step of randomly creating a pattern and/or creating a pattern from a personal symbol.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention relates to a system and method of production of one-off items that can reflect the customer's individuality.

Figure 1:
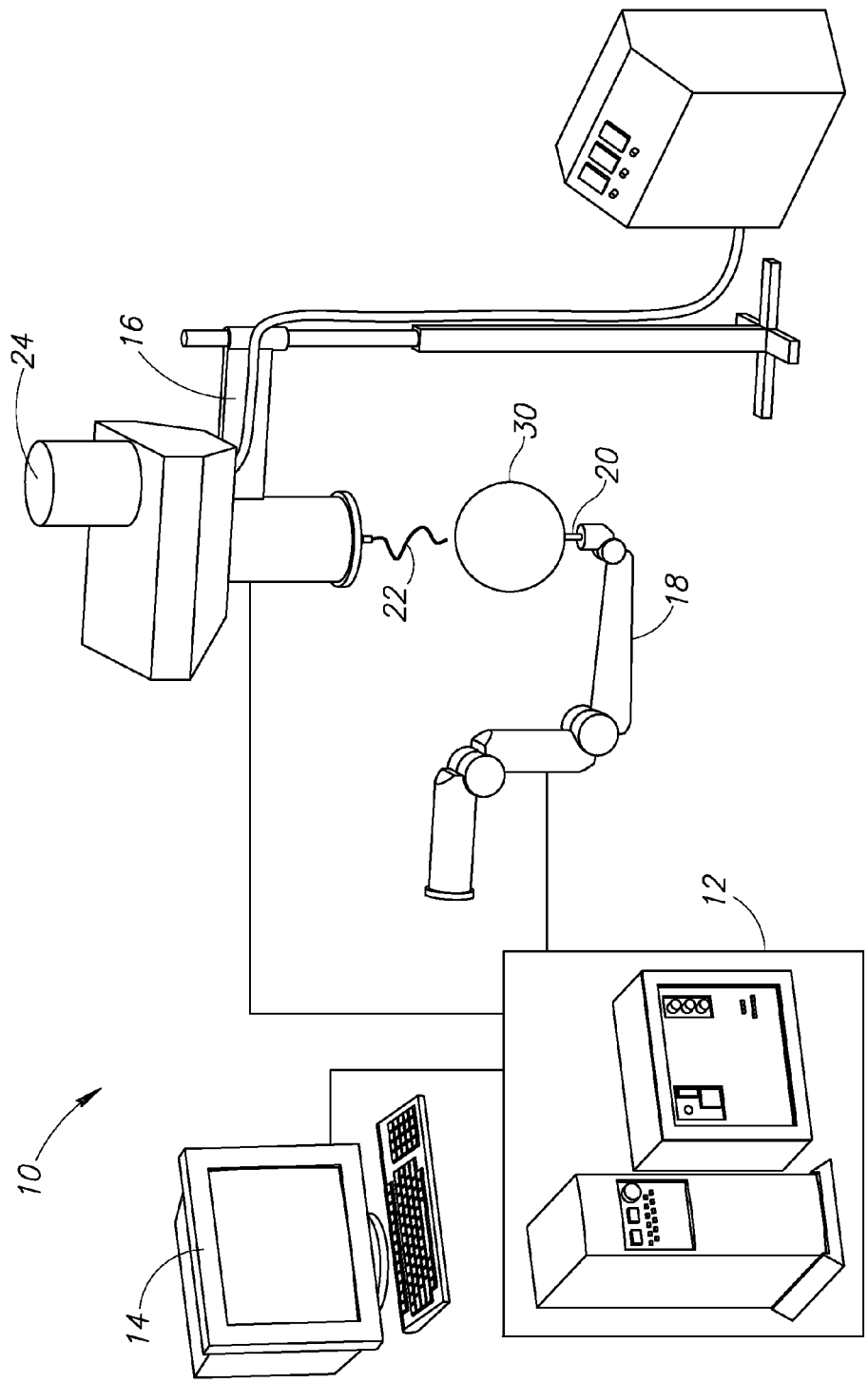
FIG. 1 is a schematic illustration of a system for producing customized products, according to an embodiment of the present invention.

Reference is now made to FIG. 1, which is a schematic illustration of a system for producing customized products, generally designated 10, according to an embodiment of the present invention. The system 10 comprises a control unit 12, in communication with a computer interface 14, an extruder 16 and a support unit 18. An adapter 20 may be fitted to the support unit 18 to enable a mold 30 to be fitted thereto.

The extruder 16 comprises at least one nozzle 22 for extruding material, such as molten plastic on to the mold 30. Thermoplastic material is one of the preferred materials, since when heated thermoplastic becomes elastic and manageable. The extruder 16 further comprises a container 24 for receiving the plastic-type material and other components such as a heater (not shown), all known in the art, which are needed to enable the plastic-type material to be extruded, in the form desired.

For the purposes of example only, the extruder 16 is shown in a vertical mode supported by a stand which may be moved on an XY plane, substantially parallel to the floor, and up and down along a vertical "Z" plane. Alternatively, the extruder 16 may be configured to lie horizontally. In another alternative mode, the extruder 16 may be adapted to be fitted to a movable support unit, such as a robotic-type arm, for example, which allows for the extruder 16 to be adjusted in any of a plurality of possible directions. Generally, the position mode of the extruder 16 may be determined by the type of molding being carried out. For example, in vertical mode, the extruder is preferable for the molding of relatively small items, while in horizontal mode, the extruder is preferable for the molding of larger items, since in horizontal mode the extruder is not generally limited (by room height, for example) and may thus mold larger items. The use of robotic-type arm which may be adjusted in any of a plurality of possible directions, is a preferred mode for the molding of more intricate items requiring more exact positioning.

The support unit 18 may be a movable unit, such as a wall mounted robotic arm, known in the art, shown for exemplary purposes in FIG. 1. In alternative embodiments, the movable support unit 18 (or robotic arm) may be mounted on any suitable surface, such as on the ceiling, the floor table or any other flat surface, for example. The type and position of the mounting may be determined by the type of molding taking place.

The adapter 20 may be configured to accept different types of mold, as will be described in further detail below.

Figure 2:
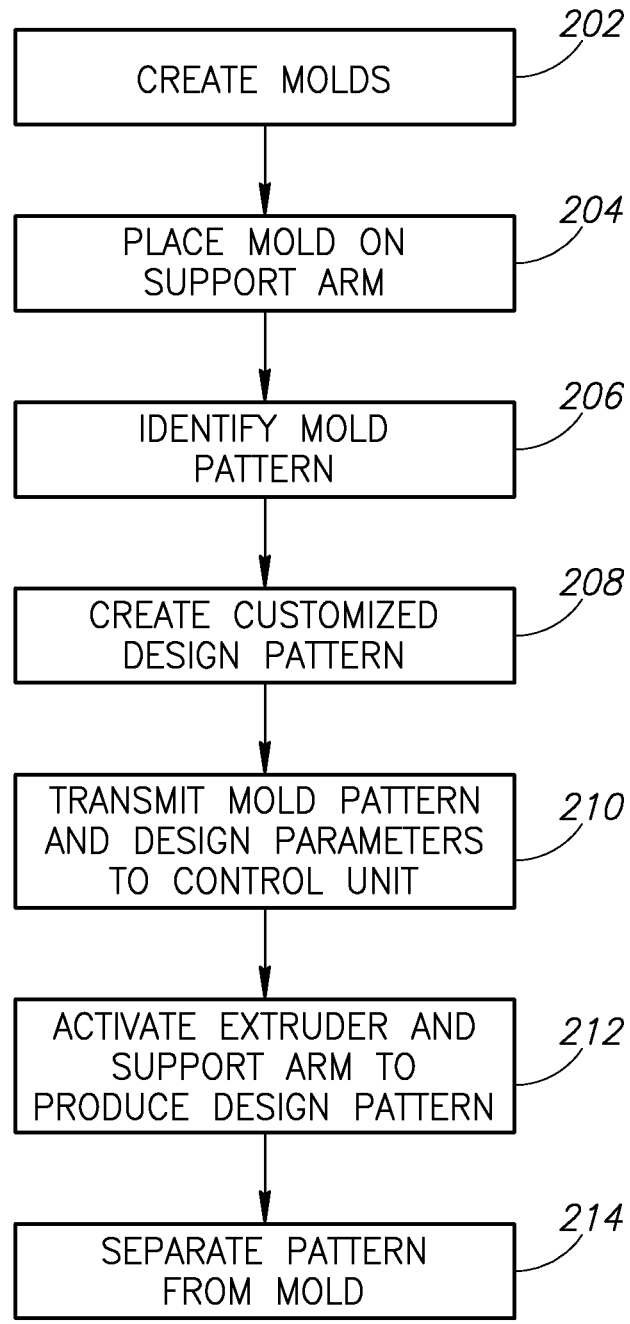
FIG. 2 is a schematic flow chart illustration of the method for producing customized products, according to an embodiment of the present invention.

Reference is now made to FIG. 2, which is a schematic flow chart illustration of the method for producing customized products using the system 10 of FIG. 1. A mold or a series of molds to be used for design may be created using computer aided design programs or manually (step 202).

Figure 3A:
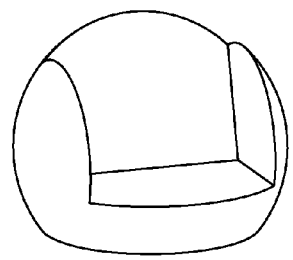
FIGS. 3A-3C schematically illustrate the design steps in creating molds for use with the production system of FIG. 1.
Figure 3B:
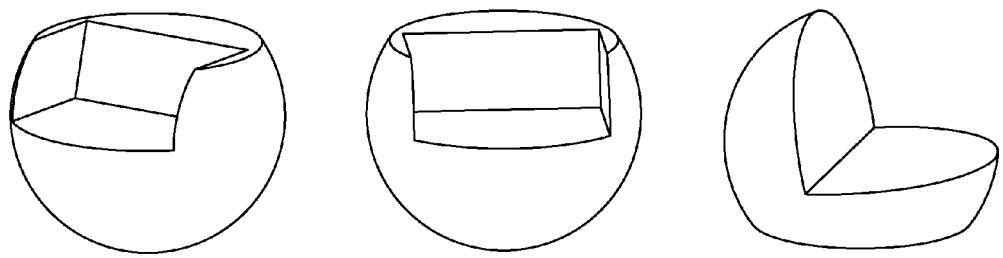
Figure 3C:
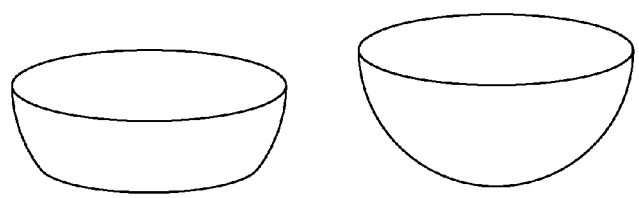

FIGS. 3A-3C illustrate the design steps in creating a mold, which may be used for molding of different items, such as a chair (FIGS. 3A and 3B) and a table (FIG. 3C).

Figure 4A:
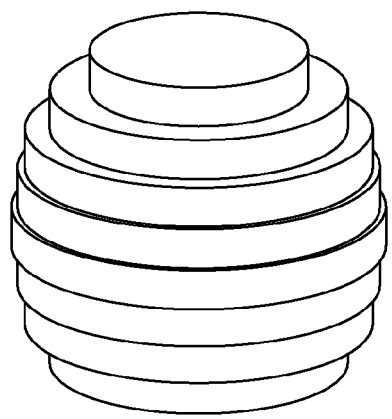
FIGS. 4A-4C are schematic illustration of foam molds built in removable layers, for use with the production system of FIG. 1.
Figure 4B:
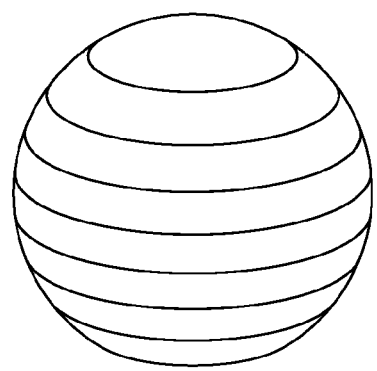
Figure 4C:
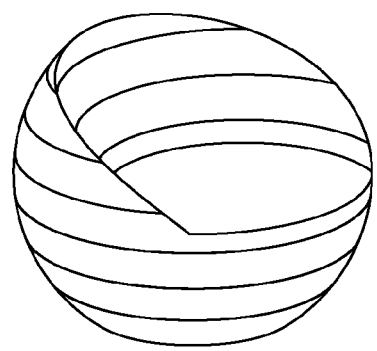

FIGS. 4A-4C are illustrative examples of the designed molds (from FIGS. 3A-3C) constructed from foam. FIG. 4A illustrates various circular sections constructed from foam, which may then be placed together to form different shapes. As shown in FIG. 4B, the various layers and sections of foam may be placed together to form a spherical ball shape. As shown in FIG. 4C, the various layers and sections of foam may be placed together to form a chair—matching the design shown in FIG. 3A. It will be appreciated that a variety of different shapes may be created by changing the number of layers.

Figure 5:
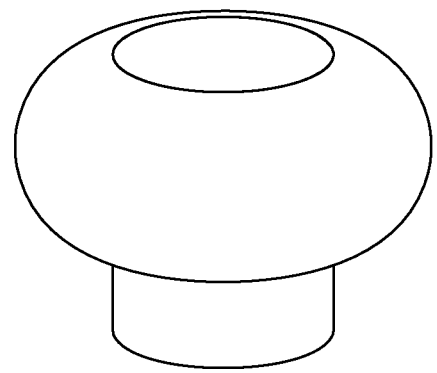
FIG. 5 is a schematic illustration of a blow up mold for use with the production system of FIG. 1.
Figure 6:
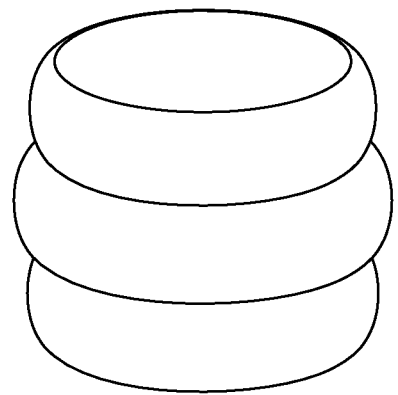
FIG. 6 is a schematic illustration of a single unit foam mold for use with the production system of FIG. 1.

FIG. 5 is a schematic illustration of an alternative type of mold which may be used with the production system of FIG. 1. FIG. 5 illustrates a blow-up mold that may be a mold constructed from material, which may be expanded to a desired shape by means of air pressure or similar. In another alternative embodiment, shown in FIG. 6, the mold may consist of a single unit foam mold, that is, a mold configured from a unitary piece of foam. In yet another alternative embodiment, the mold may be made from a hard heat resistant material (such as aluminum) that does not have undercuts and allow standard removal of the design from the mold.

The desired mold 30 may be then placed on a suitable adapter 20 configured to fit the support arm 18 (step 202). The type of mold may be identified automatically by the computer interface 14 by optical means, known in the art, or selected from a database of molds, for example (step 206).

A customized design may be created directly on the computer interface 14 (step 208). A computer program using algorithms which allow for random patterns to be created, for example, may be used. Such a program would be useful in mass-production of random creative designs.

In an alternative embodiment, consumers will be able to send a personal symbol through the Internet and the system will be able to multiply it onto the mold creating a new design using the consumers personal symbol, for example.

The mold pattern and design parameters may then be transmitted to the control unit (step 210).

The control unit 12 activates the extruder 16 and support arm 18 to produce the customized item in accordance with the shape of the mold and design parameters (step 212). It is a feature of the invention that the customized design may be formed in a single continuous extrusion. Thus, the edges or boundaries of an item may be formed from the extruded material, giving the design a unique shape. In contrast to the prior art, which is generally limited by the outline of the mold shape, the possible designs which may be produced by the present invention is unrestricted by the mold outline and the number of possible designs are limitless.

The material which may be used includes recycled plastic such as plastic bottle caps, shampoo bottles, industrial and domestic waste and any suitable thermoplastic material, for example. The design possibilities are endless since the heated thermoplastic material becomes sufficiently elastic to be allowed to drip (or dribble) on to a mold and by changing the direction of the mold even slightly, a different design may be produced. In other words, the design is not restricted to producing expensive molds on to which identical shapes and patterns are produced, but the designer is free to create a design at will.

Finally, when the design is completed, the solidified finished article may easily be removed from the mold (step 214). The article may be allowed to dry naturally or dried by any suitable drying means (if necessary) known in the art.

In order to produce a variety of different shapes with endless design possibilities, the mold needs to be designed to be strong enough to accept the extruded material and needs to be easily separated from the finished product. The inventor has realized that by application of the correct type of mold, a multiplicity of different designs and products may be produced at a reasonable cost.

Figure 7A:
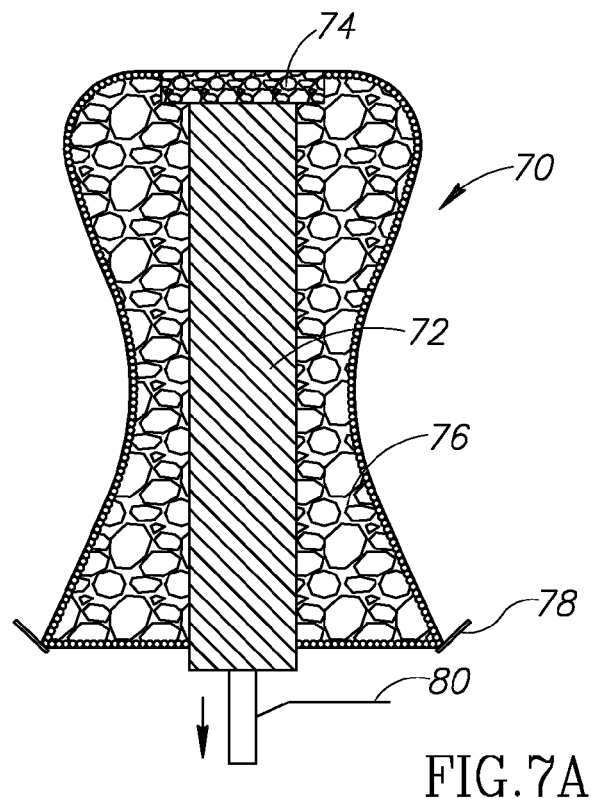
FIG. 7A is a sectional elevation of the mold used in the production of a stool, according to an embodiment of the present invention.
Figure 7B:
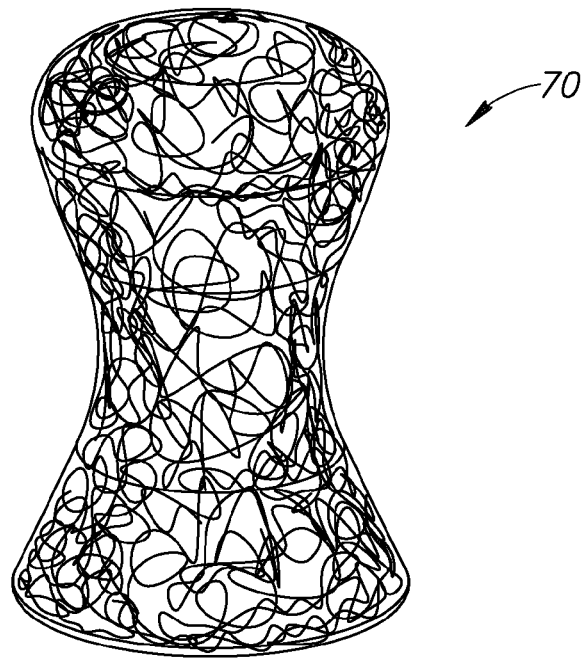
FIG. 7B is an illustration of the stool produced using the mold of FIG. 7A.

The invention may be best understood by reference to the examples, which follow. Reference is now made to FIGS. 7A and 7B. FIG. 7A is a sectional elevation of the mold generally designated 70, used in the production of a stool and FIG. 7B is an illustration of the 'Darbouka' stool produced using the mold 70. The darbouka stool is so called, since its shape resembles the oriental darbouka drum.

Mold 70 comprises a PVC rod 72 having a generally rectangular component 74 attached at one end and an adapter 80 attached at its other end, distal from the rectangular component 74. Alternatively, the rod may be constructed from aluminum, carbon fiber or any material which does not adhere to polyurethane.

The mold may be shaped according to the desired design (stool), preferably from polyurethane 76 around the PVC rod 72. A pair of aluminum flanges 78 is formed at the open end proximal to the adapter 80. The flanges are used to control the exact shape of the stool. Aluminum is preferred where precision is required in the size of the opening.

To construct the stool 70, the adapter 80 is fitted to the support unit 18 (FIG. 1), the support arm 18 may be activated via the control unit 12 to move the mold. The extruder 16 may be activated to discharge the heated molten thermoplastic material onto the mold and produce the customized design.

Once the design is completed, the designed item and the mold are separated from the adapter. In an embodiment of the invention, the mold is separated from the mold article by first removing the PVC rod 72 and then extracting the polyurethane by vacuum or any other suitable means, leaving the hollow outline of the stool (as shown in FIG. 7B). Polyurethane is preferred since it does not adhere to PVC or aluminum. Polyurethane is also used because of its flexibility and heat resistance. The exit hole left after removing the PVC rod may be filled in manually if desired.

Figure 8A:
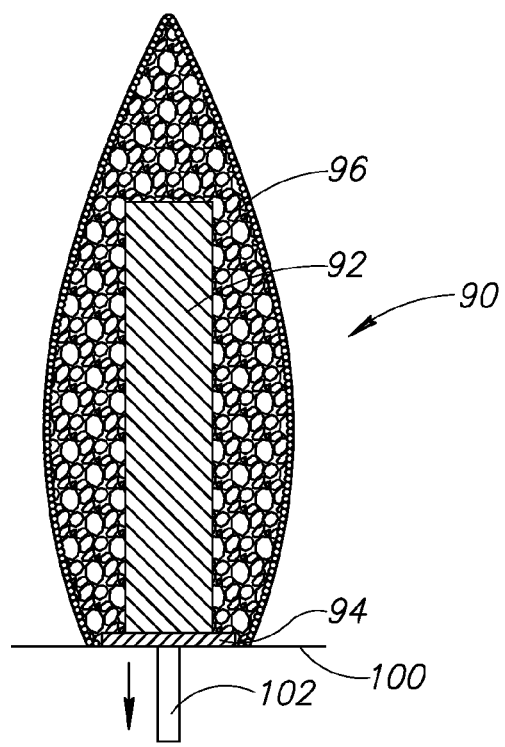
FIG. 8A is a sectional elevation of the mold used in the production of lighting units, according to an embodiment of the present invention.
Figure 8B:
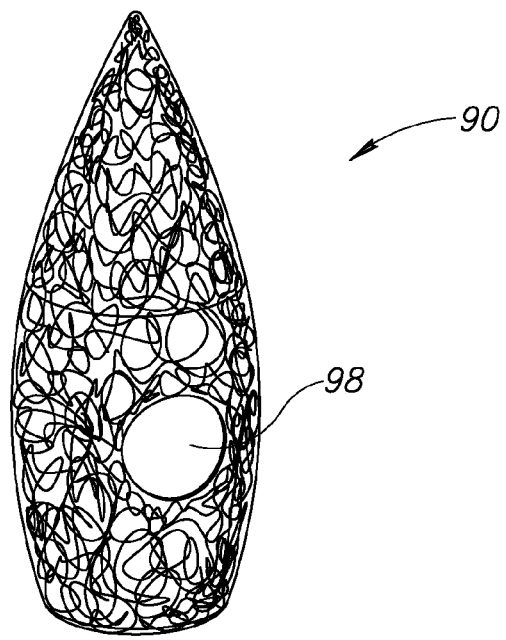
FIG. 8B is an illustration of the lighting units produced using the mold of FIG. 8A.

Reference is now made to FIGS. 8A and 8B. FIG. 8A is a sectional elevation of the mold generally designated 90, used in the production of a lighting unit and FIG. 8B is an illustration of two finished lighting units created using mold 90.

Mold 90 comprises an aluminum or PVC rod 92 having an adapter 102 attached at one end. The mold is shaped according to the desired shape, preferably from polyurethane 96 around the rod 92. A pair of aluminum flanges 100 is formed at the open end proximal to the adapter 102. An exit hole may be formed in the base, proximal to the adapter 102. An opening 98 may be formed in the polyurethane shaped mold. The perimeter of the opening 98 may be ringed with aluminum. Element 94 represents a light fitting which may be screwed onto the base of the lighting unit.

To construct the lighting unit 90, the adapter 102 may be fitted to the support unit 18 (FIG. 1), and the extruder 16 may be activated to discharge the heated molten thermoplastic material onto the mold and produce the customized design.

Once the design is completed, the designed item and the mold are separated from the adapter. In an embodiment of the invention, the mold may be separated from the mold article by first removing the rod 92 via the exit hole in the base and then extracting the polyurethane by vacuum or any other suitable means, via the opening 98, leaving the outline shape of the lighting units (as shown in FIG. 8B). The light fitting 94 may be fitted to the base by screws or any other suitable means.

Figure 9:
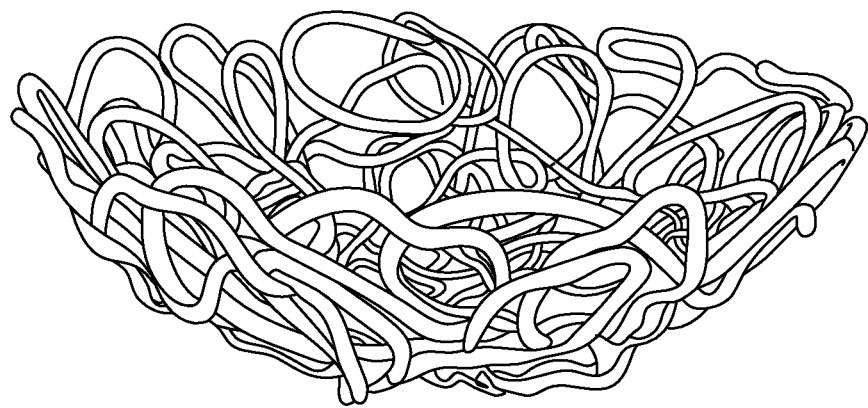
FIG. 9 is an illustration of a bowl produced using a semi-circular mold.
Figure 10:
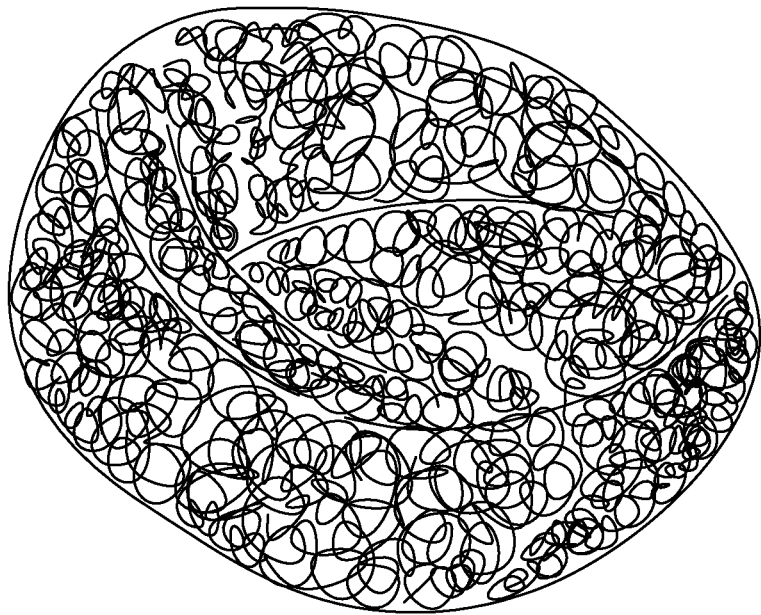
FIG. 10 is an illustration of a lace chair produced using a mold of FIG. 4C.

Additional examples of designs are shown in FIGS. 9 and 10. FIG. 9 is an illustration of a bowl produced using a semi-circular mold, which may be a heat resistant material such as aluminum. FIG. 10 is an illustration of a lace chair produced using a mold of FIG. 4C.

Figure 11A:
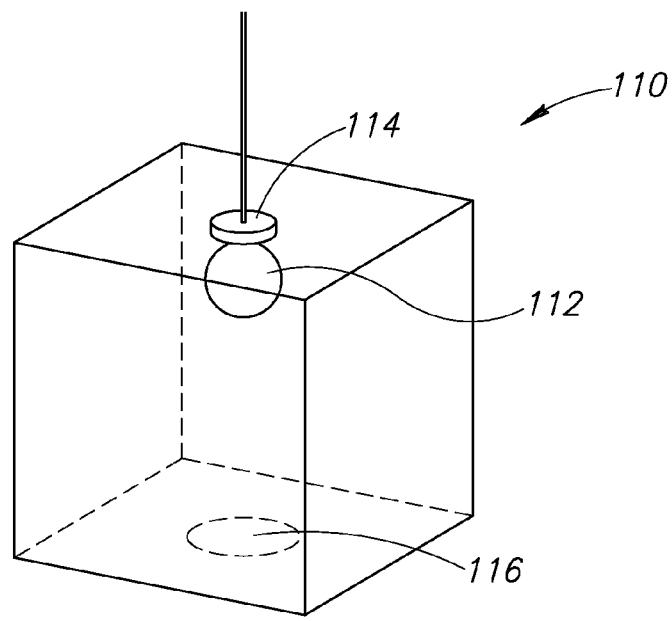
FIG. 11A is an isometric outline view of the mold used for the creation of the lighting unit of FIG. 11B.
Figure 11B:
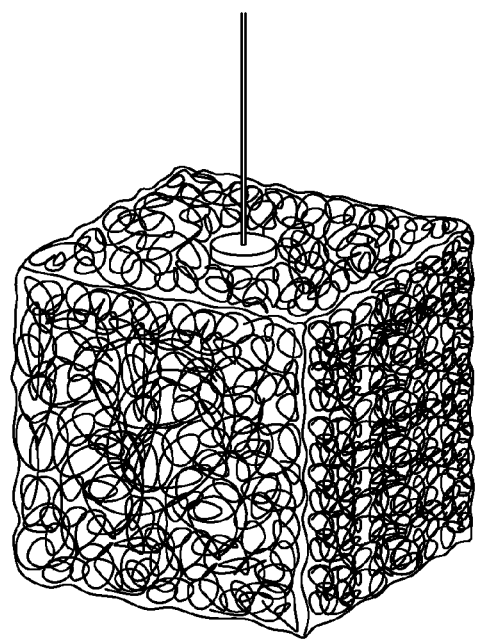

In an alternative embodiment, molds may be created using cardboard or similar material. For example, a cardboard box may be used to create a square or rectangular shaped item, such as a hanging lamp 110 shown in FIGS. 11A and B. In this case, the unit may be constructed in a manner similar to that of the lighting units of FIGS. 8A and 8B, using a cardboard box (carton) mold in place of the polyurethane mold. Once the design is completed, the cardboard may be removed by dissolving in a bath of water, for example. The light fitting 112 may be installed by screwing the lamp into a fitting 114. The fitting may be set into the cardboard mold prior to molding. The aperture 116 allows for the fitting the light bulb into the fitting 114 once the mold has been removed.

In an alternative embodiment, the fitting 114 may be inserted after the mold has been removed via the aperture 116.

It should be appreciated that the since a feature of the invention is that the design may be a single continuous extrusion, the edges of the lamp are formed by the extruded material. Thus, the final product is unique and is dissimilar from a standard box-type fitting with six identical sides.

In a further alternative embodiment, molds may be created using a silicone coating on a heat resistant synthetic fabric, such as Kevlar™, for example, which can withstand temperatures of 120-180° C. or even higher.

According to further embodiments of the invention, the molding-material may be made from any material known in the art that allows shaping and reshaping, such as Polystyrene (PS) Plastic Resin and Styrene Acrylonitrile (SAN) Plastic Resin, Acrylonitrile Butadiene Styrene (ABS) Plastic Resin, Polypropylene, Acrylic, Thermoplastic rubber (TPR), and any other thermoplastic plastic material known in the art. Table 1 is a non-exclusive list of thermoplastic materials, which may be used to create the design patterns.

Additionally, reusable raw material such as recycled plastic may also be used. The designed products are not limited to a single color but may combine colors, and different extruded patterns. Furthermore, any material that behaves like thermoplastic such as glass and wax, for example, may be used.

TABLE 1

List of Thermoplastic Materials

| | |
|---|---|
| ABS | Acrylonitrile butadiene styrene |
| ACS | Acrylonitrile-chlorinated polyethylene-styrene |
| BR | Butadiene rubber |
| CA | Cellulose acetate |
| CAB | Cellulose acetate butyrate |
| CPE | Chlorinated polyethylene |
| CPVC | Chlorinated Polyvinyl chloride |
| DAP | DiallyLphhalate |
| EC | Ethyl cellulose |
| ECTFE | Ethylene chlorotrifluoroethylene |
| EMA | Ethylene methacrylate |
| EP | Epoxy |
| EPDM | Ethylene-propylene-diene monomer |
| EPM | Ethylene-propylene |
| ETFE | Ethylene tetrafluoroethylene |
| EVA | Ethylene vinyl acetate |
| FEP | Fluorinated ethylene propylene |
| HDPE | High density polyethylene |
| HIPS | High impact polystyrene |
| HMWPE | High molecular weight P.E |
| LDPE | Low-density polyethylene |
| LLDPE | Linear low-density polyethylene |
| MF | Melamine-formaldehyde |
| NBR | Acrylonitrile-butadiene rubber |
| NC | Nitrocellulose |
| PA | Polyamide |
| PAA | Polyacrylic Acid |
| PAN | Polyacrylonitrile |
| PB | Polybutadiene |
| PBT | Polybutylene terephthalate |
| PC | Polycarbonate |
| PE | Polyethylene |
| PEG | Polyethylene glycol |
| PEEK | Polyether ether ketone |
| PET | Polyethylene terephthalate |
| PF | Phenol-formaldehyde resin |
| PIB | Polyisobutylene |
| PIR | Polyisocyanurate |
| PMMA | Polymethyl methacrylate |
| POM | (Polyoxy methylene,(acetal |
| PP | Polypropylene |
| PPG | Polypropylene glycol |
| PPO | Polyphenylene oxide |
| PPS | Polyphenylene sulfide |
| PS | Polystyrene |
| PTFE | Polytetrafluoroethylene |
| PTMG | Polytetramethylene glycol |
| PU | Polyurethane |
| PVA | Polyvinyl acetate |
| PVAL | Polyvinyl alcohol |
| PVB | Polyvinyl butyral |
| PVC | Polyvinyl chloride |
| PVDC | Polyvinylidene chloride |
| PVDF | Polyvinylidene fluoride |
| PVF | Polyvinyl formal |
| SAN | Styrene-acrylonitrile |
| SBR | Styrene-butadiene rubber |
| UF | Urea-formaldehyde resin |

According to further embodiments of the invention, the system may additionally comprise a stamping mechanism, enabling to create a unique stamp upon the product and/or a separated polymeric piece in a melted or soft phase (heated). The interface 14 may enable the user to design his/her signature stamp and produce a "brand-like" tag. The input for creating this unique stamp may be, for example, the user's fingerprint—where a scanner and re-shapeable stamping means are integrated with the system enabling to scan the user's print and create a sculptured mold of the fingerprint according to the input, for example.

It will be appreciated that the invention is not limited to the examples shown but that there are unlimited possible designs which may be created by extruding molten thermoplastic using different combinations of molds.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention.

It will be appreciated that the present invention is not limited by what has been described hereinabove and that numerous modifications, all of which fall within the scope of the present invention, exist.

Rather the scope of the invention is defined by the claims, which follow:

The invention claimed is:

1. A method for producing products, the method comprising the steps of:
    creating a three dimensional mold;
    creating a customized design pattern, having design parameters;
    fitting the three dimensional mold onto a support unit, the support unit being adjustable in any of a plurality of possible directions, rotatable on multiple axes;
    activating the support unit holding the three dimensional mold, to present each face of the three dimensional mold, in accordance with the design parameters, to an extruder and concurrently activating the extruder to extrude material in accordance with the design parameters and the shape of the mold onto each face of the three dimensional mold; and
    separating the three dimensional mold from the finished designed product;
    thereby creating the designed product.

2. The method according to claim 1, wherein said extruder comprises at least one nozzle for extruding material, a container for receiving material and a heater; and wherein said step of activating the extruder comprises the steps of:
    heating the material to an elastic state for extrusion; and
    extruding the heated material through the at least one nozzle in a single continuous extrusion onto each face of the mold.

3. The method according to claim 2, wherein said step of activating an extruder further comprises the step of:
    moving the extruder into one of a group of modes including a horizontal mode and a vertical mode.

4. The method according to claim 2, wherein said step of activating an extruder further comprises the step of:
    attaching the extruder to a movable arm configured to move along any one of three axes; and
    activating the extruder to extrude material in accordance with the design parameters onto each face of the three dimensional mold.

5. The method according to claim 4, wherein said step of activating a support unit comprises the step of:
   mounting the movable arm onto any of a group of surfaces including a wall, ceiling, floor, table and flat surface.

6. The method according to claim 1, wherein the step of creating a customized design pattern comprises the step of creating random patterns.

7. The method according to claim 1, wherein the step of creating a customized design pattern comprises the step of creating a pattern from any of a group of personal symbols including a logo, a computerized design and a digital design.

8. The method according to claim 1, wherein the step of creating a three dimensional mold comprises the step of:
   forming the mold from any of a group of materials including polyurethane foam, cardboard, silicone coating on a heat resistant fabric, an inflatable or expandable heat resistant surface.

9. The method according to claim 1, wherein the step of creating a three dimensional mold comprises the steps of:
   shaping the mold around a separator, said separator having an adapter attached thereto; and
   forming an aperture in the perimeter of the shaped mold, said aperture being configured to allow the separator to be extracted from the mold.

* * * * *